United States Patent
Makinen (10) Patent No.: US 6,920,612 B2
(45) Date of Patent: Jul. 19, 2005

(54) SYSTEMS AND METHODS FOR PROVIDING DEDICATED HELP SERVICES IN A GRAPHICAL USER INTERFACE-BASED COMPUTER APPLICATION

(75) Inventor: Bruce A Makinen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 590 days.

(21) Appl. No.: 09/997,834

(22) Filed: Nov. 29, 2001

(65) Prior Publication Data

US 2003/0098876 A1 May 29, 2003

(51) Int. Cl.[7] .......................... G06F 3/14; G06F 19/00
(52) U.S. Cl. ...................... 715/705; 715/708; 715/804; 715/714; 715/712; 702/40; 702/35; 700/110
(58) Field of Search ................................. 345/714, 705, 345/708, 804, 964, 709, 711, 712, 715, 781, 793, 791, 805; 702/35, 38, 40, 58, 81, 84; 700/109, 110

(56) References Cited

U.S. PATENT DOCUMENTS

| 5,535,422 A | * | 7/1996 | Chiang et al. ............... 345/709 |
| 5,715,415 A | * | 2/1998 | Dazey et al. ................ 345/708 |
| 5,828,374 A | * | 10/1998 | Coleman et al. ......... 345/712 X |
| 5,877,961 A | * | 3/1999 | Moore ..................... 700/110 X |
| 5,933,140 A | * | 8/1999 | Strahorn et al. ............. 345/712 |
| 6,297,822 B1 | * | 10/2001 | Feldman ..................... 345/705 |
| 6,456,303 B1 | * | 9/2002 | Walden et al. .............. 345/705 |
| 6,573,906 B1 | * | 6/2003 | Harding et al. ............. 345/705 |

OTHER PUBLICATIONS

"Persistent Help Window for Information and Selection", IBM Technical Disclosure Bulletin, vol. 34, No. 3, Aug. 1, 1991, pp. 122–123.*

"Enabling Switching Between Window–Level and Context–Sensitive Helps", IBM Technical Disclosure Bulletin, vol. 38, No. 4, Apr. 1, 1995, pp. 367–368.*

* cited by examiner

Primary Examiner—Raymond J. Bayerl (57) ABSTRACT

A method for providing help services in a graphical user interface-based computer application includes providing a first display portion and a second display portion. The first display portion provides standard application services and the second display portion provides dedicated help services based on the standard application services provided in the first display portion. The method also includes determining a user interaction via the first display portion, and, based on the user interaction, providing a standard application service associated with the computer application in the first display portion. Furthermore, the method includes providing dedicated help services in the second display portion based on the standard application service provided in the first display portion.

17 Claims, 6 Drawing Sheets

SYSTEMS AND METHODS FOR PROVIDING DEDICATED HELP SERVICES IN A GRAPHICAL USER INTERFACE-BASED COMPUTER APPLICATION

TECHNICAL FIELD

The present invention is generally related to graphical user interface (GUI)-based computer applications and, more particularly, is related to systems and methods for providing help services in a GUI-based computer application.

BACKGROUND OF THE INVENTION

Currently, a variety of systems and/or processes are used for inspecting manufacturing defects in printed circuit boards. Printed circuit boards typically include one or more electrical components (e.g., computer chips, capacitors, etc.) soldered to an integrated circuit (IC). For many years, the de facto process for production of printed circuit board assemblies included manual visual inspection (MVI) after soldering, followed by an electrical test, such as in-circuit testing (ICT), at the end of the assembly process to isolate any defects that occurred during manufacturing. Typically, a final functional test was run to verify that the printed circuit board operated properly before it was integrated into a final product.

As the need for more complex printed circuit boards having more components increased, automated inspection systems became popular. Such inspection systems typically comprise a printed circuit board modeling system, an imaging system, and a control system. Typically, the modeling system is used to generate a computer model of a printed circuit board that is to be mass-produced. The imaging system comprises hardware and/or software for capturing an image of the manufactured printed circuit board. Currently, image systems employ a variety of imaging techniques (e.g., x-ray, optical, ultrasonic, thermal image, etc.). The control system typically receives a file containing a computer model of the particular printed circuit board from the modeling system. Based on the computer model, the control system may generate an inspection program to be implemented by the imaging system. The inspection program may be used to image a manufactured printed circuit board, which is based on the computer model generated by the modeling system. After the imaging system generates the images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Control systems implemented in current PCB inspection systems typically employ a graphical user interface to assist in generating the inspection program to be implemented by the imaging system and for interfacing with the PCB modeling system. Such control systems, however, may be very complex and require a substantial amount of user training in order to be operated effectively. Accordingly, many such systems integrate application help, or help services, as part of the computer application. Such help services are very limited. For example, such systems typically provide the help services on a transient basis, in a separate window or dialog box, and only after the user has asked for the help to be displayed. This may be problematic for a variety of reasons. For instance, in such systems and other computer applications, the user has to know the help services are available in order to initiate them. The separate dialog box or window must be managed. In other words, the user may have to manipulate the dialog box or window within the display screen, such as by minimizing it or placing it beneath the main application window. Furthermore, such systems and other computer applications provide help services associated with the computer application as an all-or-nothing proposition. The help services are either displayed or not displayed and the user has a burden to initiate and manage the help services.

Thus, there is a need in the industry for systems and methods for providing dedicated help services in a computer application.

SUMMARY OF THE INVENTION

The present invention provides systems and methods for providing help services in a graphical user interface-based computer application.

One embodiment of the present invention is a method for providing help services in a graphical user interface-based computer application. Briefly described, one such method comprises the steps of: providing a first display portion for providing standard application services and a second display portion for providing dedicated help services based on the standard application services provided in the first display portion; determining a user interaction via the first display portion; based on the user interaction, providing a standard application service associated with the computer application in the first display portion; and based on the standard application service provided in the first display portion, providing dedicated help services in the second display portion.

Another embodiment is a computer program embodied in a computer-readable medium. Briefly described, one such computer program comprises logic configured to: provide a first display portion for providing standard application services and a second display portion for providing dedicated help services based on the standard application services provided in the first display portion; determine a user interaction via the first display portion; based on the user interaction, provide a standard application service associated with the computer application in the first display portion; and based on the standard application service provided in the first display portion of the graphical user interface, provide dedicated help services in the second display portion.

Another embodiment is a system for providing a computer application. Briefly described, one such system comprises: a means for providing a graphical user interface associated with the computer application, the graphical user interface comprising a first portion for providing standard application services and a second portion for providing dedicated help services based on the standard application services provided in the first portion of the graphical user interface; a means for determining a user interaction via the first portion of the graphical user interface; a means for providing, based on the user interaction, a standard application service associated with the computer application in the first portion of the graphical user interface; and a means for providing, based on the standard application service provided in the first portion of the graphical user interface, dedicated help services in the second portion of the graphical user interface based on the standard application service provided in the first portion of the graphical user interface.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
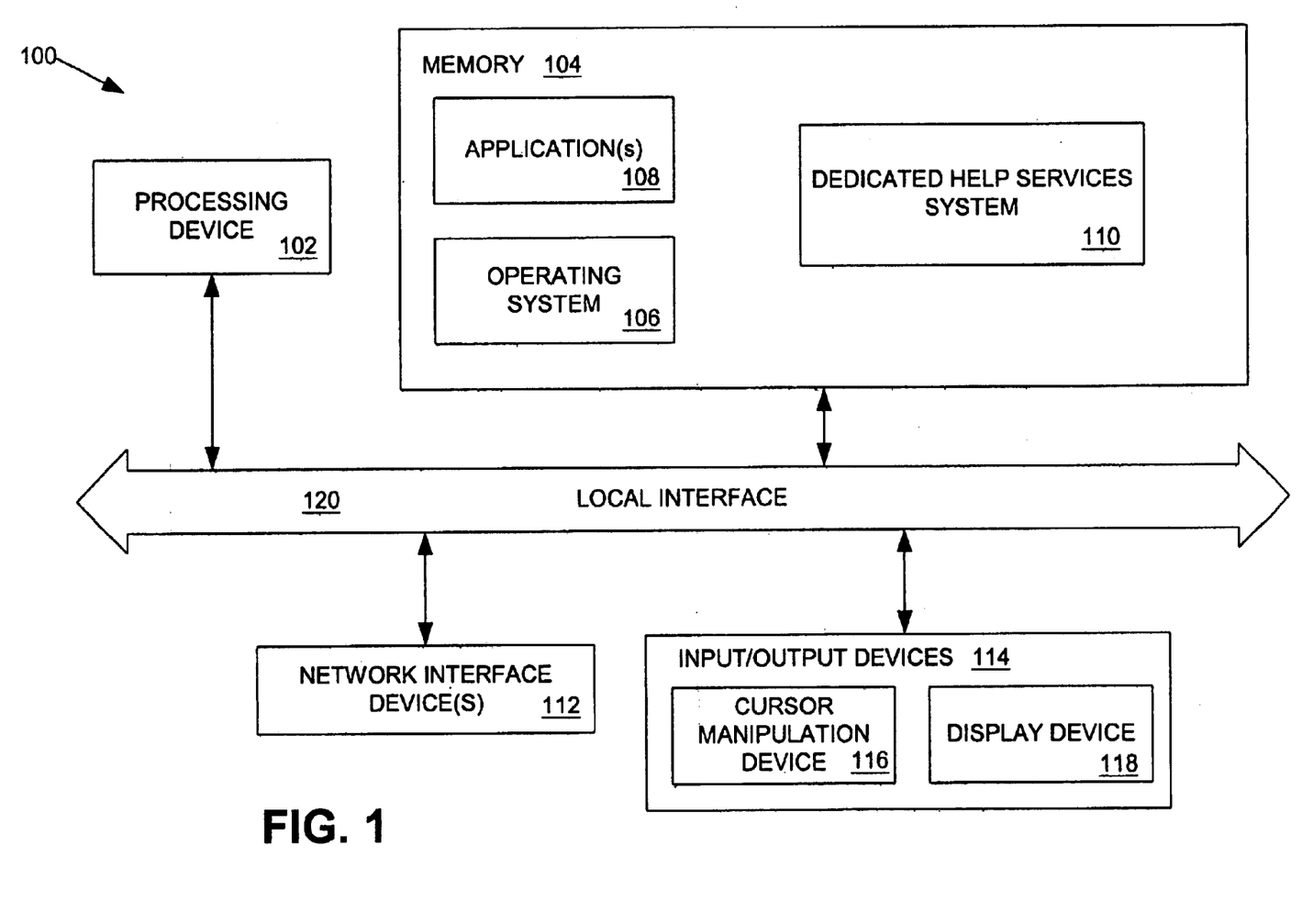
FIG. 1 is a block diagram of an embodiment of a system in which a dedicated help services system 100 of the present invention may be implemented.

FIG. 1 is a block diagram of a system 100 in which an embodiment of a dedicated help services system 110 of the present invention may be implemented. As described in more detail below, in general, dedicated help services system 110 may be adapted for providing help services corresponding to a computer application (e.g., a graphical user interface (GUI)-based computer application, windows-based computer application, etc.). By way of example, a computer application may be configured to support a graphical user interface. The graphical user interface may be adapted to enable a user to interact with the application services provided by the computer application. The computer application may configured to provide any type of application, or application services. For instance, the computer application may be a word processing application, a spreadsheet application, a web browser application, and a computer-aided design (CAD) application, to name a few. One of ordinary skill in art will appreciate that the precise configuration of the computer application and the precise characteristics of the application services provided by the computer application are not critical to the functionality, architecture, and operation of dedicated help services system 110 of the present invention. Rather, as described below in detail, the important aspect of the present invention is that dedicated help services system 110 provides dedicated help services associated with the computer application to a user within the same screen real estate as the standard application services.

Figure 2:
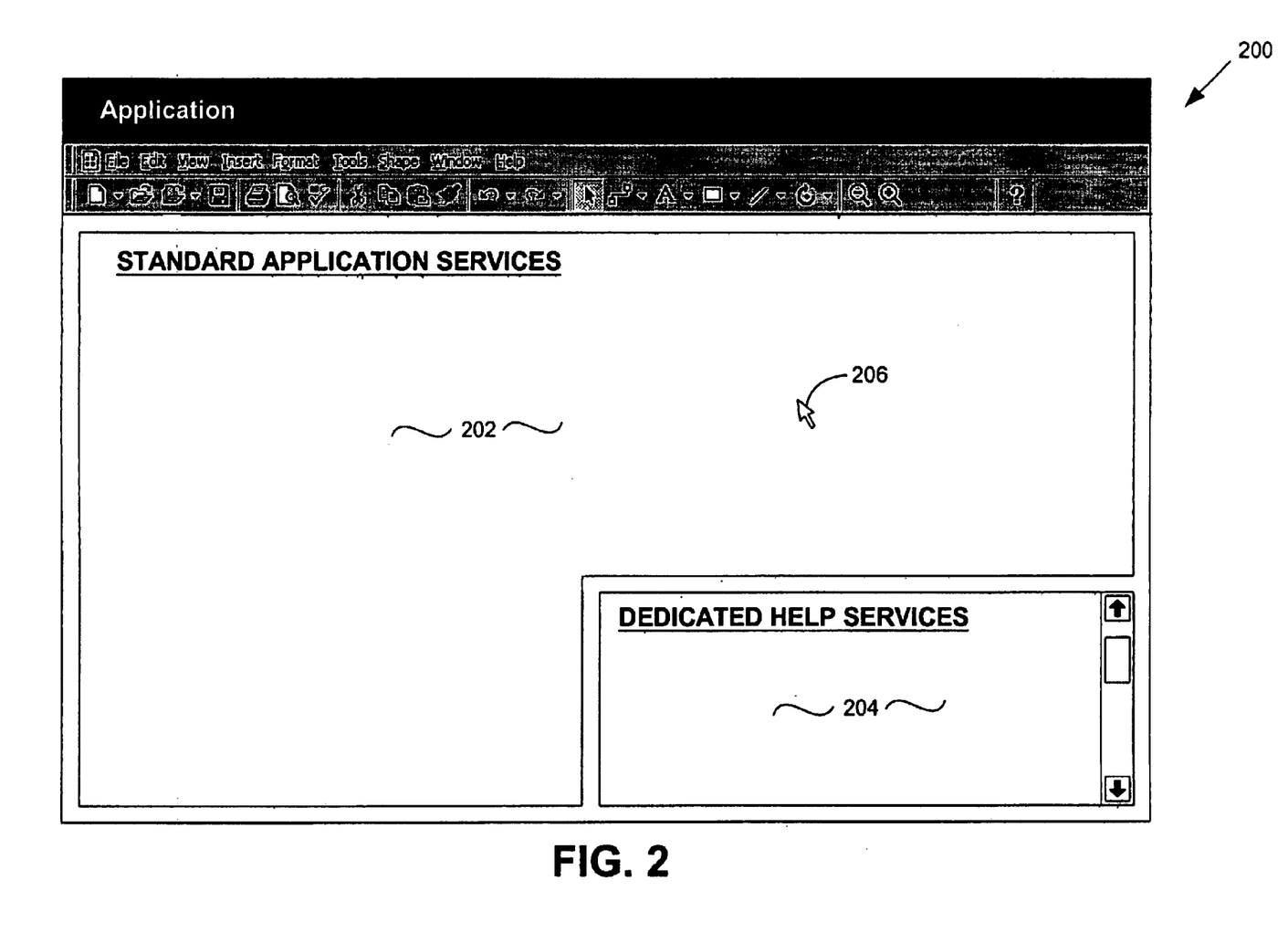
FIG. 2 is a screen shot of an embodiment of a graphical user interface illustrating an implementation of the dedicated help services system of FIG. 1.

FIG. 2 is a screen shot 200 of an embodiment of a graphical user interface illustrating an implementation of dedicated help services system 110 in a computer application. As illustrated in FIG. 2, the computer application may be presented to the user in a window of the graphical user interface. One of ordinary skill in the art will appreciate, however, that the computer application need not be presented in a graphical user interface or a window. In fact, the computer application may be configured to be displayed in any format on a display device.

Referring again to the embodiment illustrated in FIG. 2, the computer application may be configured to provide a first display portion 202 in which the standard application services may be provided. As further illustrated in FIG. 2, the computer application may be further configured to provide a second display portion 204 in which the dedicated help services associated with the computer application may be provided to the user. The user may interact with the standard application services provided in the first display portion 202 and/or the help services provided in the second display portion 204 by, for example, manipulating a cursor 206.

Dedicated help services system 110 may be implemented in software, firmware, hardware, or a combination thereof. In the embodiment illustrated in FIG. 1, dedicated help services system 110 is implemented in software, as an executable program, which is executed by a processing device 102. Generally, in terms of hardware architecture, as shown in FIG. 1, system 100 comprises a processing device 102, memory 104, one or more network interface devices 112, and one or more input and/or output (I/O) devices 114 interconnected via a local interface 120. System 100 may further comprise additional components not illustrated in FIG. 1.

Referring again to FIG. 1, the various components of system 100 will be described. Local interface 120 may be, for example but not limited to, one or more buses or other wired or wireless connections. The local interface 120 may have additional elements, which are omitted for simplicity, such as controllers, buffers (caches), drivers, repeaters, and receivers, to enable communications. Furthermore, the local interface 120 may include address, control, and/or data connections to enable appropriate communications among the aforementioned components.

Processing device 102 is a hardware device for executing software, particularly that stored in memory 104. Processing device 102 may be any custom-made or commercially-available processor, a central processing unit (CPU), an auxiliary processor among several processors associated with system 100, a semiconductor based microprocessor (in the form of a microchip or chip set), a macroprocessor, or generally any device for executing software instructions.

As illustrated in FIG. 1, memory 104 may comprise an operating system 106, one or more applications 108, and dedicated help services system 110. The architecture, operation, and/or functionality of dedicated help services system 110 will be described in detail below. Memory 104 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 104 may incorporate electronic, magnetic, optical, and/or other types of storage media. Furthermore, memory 104 may have a distributed architecture, in which various components are situated remote from one another, but can be accessed by processing device 102.

The software in memory 104 may include one or more separate programs, each of which comprises executable instructions for implementing logical functions. In the example of FIG. 1, the software in memory 104 includes dedicated help services system 110 according to the present invention. Memory 104 may further comprise a suitable operating system 106 that controls the execution of other computer programs, such as one or more applications 108 and dedicated help services system 110, and provides scheduling, input-output control, file and data management, memory management, and communication control and related services.

Dedicated help services system 110 may be a source program, executable program (object code), script, or any other entity comprising a set of instructions to be performed. When implemented as a source program, then the program needs to be translated via a compiler, assembler, interpreter, or the like, which may or may not be included within the memory 104, so as to operate properly in connection with operating system 106. Furthermore, dedicated help services system 110 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. Furthermore, one of ordinary skill in the art will appreciate that dedicated help services system 110 may be implemented in a variety of ways. For example, in certain embodiments, dedicated help services system 110 may be implemented as a function that may be called by operating system 106 and/or an application 108. In alternative embodiments, the functionality of dedicated help services system 110 may be seamlessly implemented within an application 108.

Network interface device(s) 112 may be any device configured to facilitate communication between system 100 and a communication network, such as a public or private packet-switched or other data network including the Internet, a circuit switched network, such as the public switched telephone network, a wireless network, an optical network, or any other desired communications infrastructure.

Input/output devices 114 may comprise any device configured to communicate with local interface 120. One of ordinary skill in the art will appreciate that, depending on the configuration of system 100, input/output devices 120 may include any of the following, or other, devices: a keyboard, a mouse, display device, such a computer monitor, a serial port, a parallel port, a printer, speakers, a microphone, etc.

Referring again to FIG. 1, system 100 may include a cursor manipulation device 116 and a display device 118. As stated above, the computer application may be configured to provide application services to a user in first display portion 202 and simultaneously provide dedicated help services to the user, within the same screen real estate, in second display portion 204. Thus, during operation of system 100, the user may interact with the computer application and dedicated help services system 110 via display device 118 and cursor manipulation device 116. Display device 118 may comprise any of the following (or other) types of devices configured to support the graphical user interface: a computer monitor, a liquid crystal display (LCD), a plasma-based display, an LED-based display, a touch-sensitive screen, such as those implemented in portable computing devices (e.g., a personal digital assistant (PDA)), and any other known or future display device, regardless of the underlying display technology. Furthermore, cursor manipulation device 116 may comprise any input device configured to cooperate with an application 108, operating system 106, and/or dedicated help services system 110 and manipulate a cursor displayed on the display device 118. For example, cursor manipulation device 116 may comprise a mouse, a trackball, a set of navigation keys (e.g., arrow keys), a keyboard, and a joystick stick, to name a few.

During operation of system 100, the processing device 102 is configured to execute logic stored within the memory 104, to communicate data to and from the memory 104, and to generally control operations of the system 100 pursuant to the software. Dedicated help services system 110 and operating system 106, in whole or in part, but typically the latter, are read by the processing device 102, perhaps buffered within the processing device 102, and then executed.

In embodiments where dedicated help services system 110 is implemented in software, as is shown in FIG. 1, dedicated help services system 110 may be stored on any computer-readable medium for use by or in connection with any computer related system or method. In the context of this document, a computer-readable medium may be an electronic, magnetic, optical, or other physical device or means that may contain or store a computer program for use by or in connection with a computer-related system or method. Dedicated help services system 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where dedicated help services system 110 is implemented in hardware, dedicated help services system 110 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
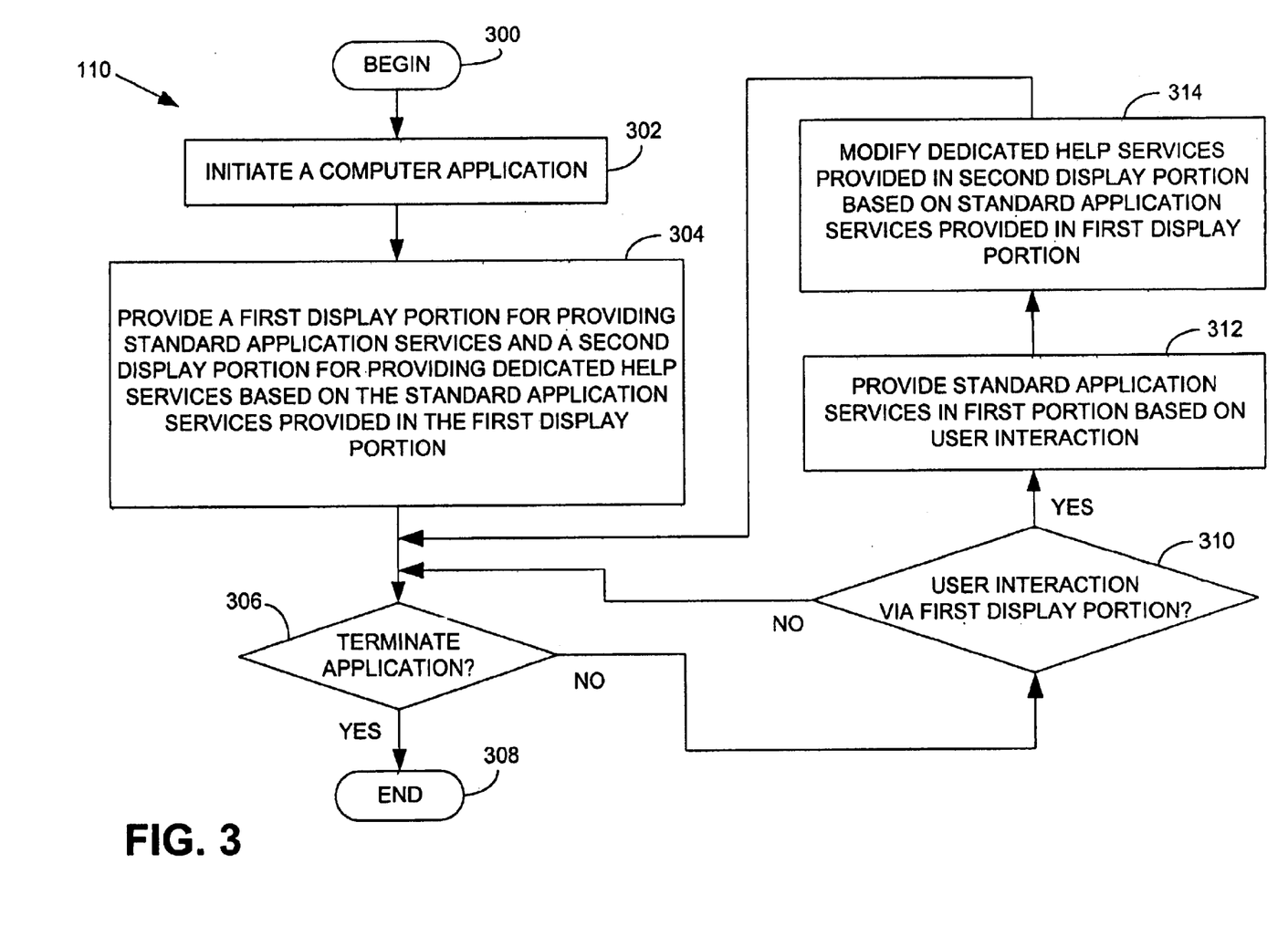
FIG. 3 is a flow chart illustrating the architecture, operation, and/or functionality of the dedicated help services system of FIGS. 1 and 2.

FIG. 3 is a flow chart illustrating the architecture, functionality, and/or operation of an embodiment of dedicated help services system 110. Dedicated help services system 110 begins at block 300. Dedicated help services system 110 may be initiated by a user via an I/O device 114.

As stated above, in certain embodiments, dedicated help services system 110 may be implemented as a function that may be called by operating system 106 and/or an application 108. In alternative embodiments, the functionality of dedicated help services system 110 may be seamlessly implemented within an application 108. Regardless of the manner in which dedicated help services system 110 is initiated, at block 302, the computer application is initiated.

At block 304, dedicated help services system 110 provides a first display portion in which standard application services may be provided to the user. Dedicated help services system 110 also provides a second display portion in which dedicated help services may be provided to the user. At decision block 306, dedicated help services system 110 determines whether the computer application is terminated. If the computer application is terminated, dedicated help services system 110 terminates at block 308. If the computer application is not terminated, as illustrated by blocks 310 and 312, a user may interact with the standard application services provided in the first display portion. One of ordinary skill in the art will appreciate that the user may interact with the standard application services in a variety of ways depending on the particular configuration and/or characteristics of the application services. For example, as described above, the user may manipulate a cursor, input text, etc.

Based on the user interaction with the standard application services via the first display portion, at block 314, dedicated help services system 110 modifies the help services provided in the second display portion. For example and not by way of limitation, consider a situation in which the computer application provides standard word processing services in the first display portion. Thus, the user may be able to perform standard word processing functions, such as creating a document. As a further example, assume that the user attempts to insert an image into the document. As the user interacts with the computer application and attempts to insert the image into the document, dedicated help services system 110 may provide the user with helpful information in the second display portion designed to help the user perform the desired function. It will be appreciated that dedicated help services system 110 is configured to continually provide such help services in the second display portion based on the content of the first display portion and/or the user interaction occurring via the first display portion. In other words, the help services are continually provided in the second display portion while the computer application is active and providing application services in the first display portion.

Dedicated help services system 110 may be further configured to manage user interaction with the help services provided in the second display portion. One of ordinary skill in the art will appreciate that help services may be provided in a variety of ways. For example, dedicated help services system 110 may be configured to merely provide helpful information in the form of static text that the user may read. In other embodiments, dedicated help services system 110 may be configured to provide interactive help services whereby the user may further specify the help services to be provided. For instance, in the above example of the word processing application where the user desires to insert an image into a document, the help services may support hypertext markup language (HTML). Thus, the initial help services may be in the form of hypertext links to various aspects of the process of inserting an image into the document. In this manner, dedicated help services system 110 may be configured to enable the user to select a hypertext link to additional information about a specific function. When the hypertext link is selected, the contents of the second display portion may be updated with the additional information.

Dedicated help services system 110 may be further configured to enable the user to initiate more detailed help services, which may be provided outside of the original display portion. For example, the original help services provided in the second display portion may include a link to the detailed services. When the link is selected by the user (e.g., by pressing a particular key on a keyboard, clicking an object in the display portion, etc.), another window may be displayed, in which the detailed help services are provided.

Figure 4:
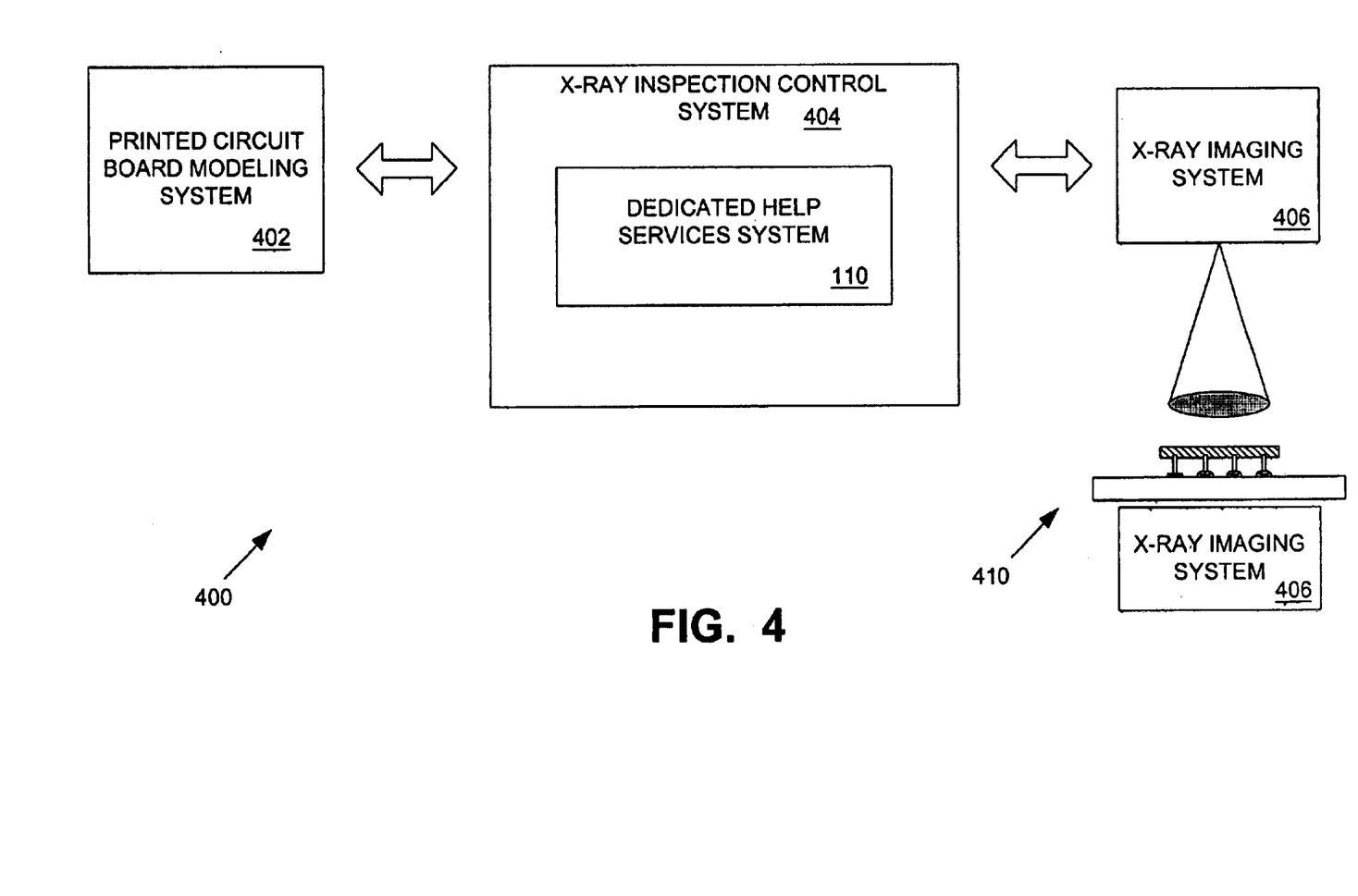
FIG. 4 is a block diagram of another embodiment of a system in which the dedicated help services system of FIG. 3 may be implemented.

Dedicated help services system 110 may be implemented in a variety of other systems and/or a variety of computer applications. FIG. 4 is a block diagram of a system 400 for inspecting manufacturing defects in printed circuit boards, in which dedicated help services system 110 may be implemented. System 400 comprises a printed circuit board (PCB) modeling system 402, an x-ray inspection control system 404, an x-ray imaging system 406, and a printed circuit board 410. In general, PCB modeling system 402 is a system for generating a computer model of a printed circuit board. PCB modeling system 402 may be any known or later developed computer-aided design (CAD) system capable of modeling any type of printed circuit board.

Figure 5:
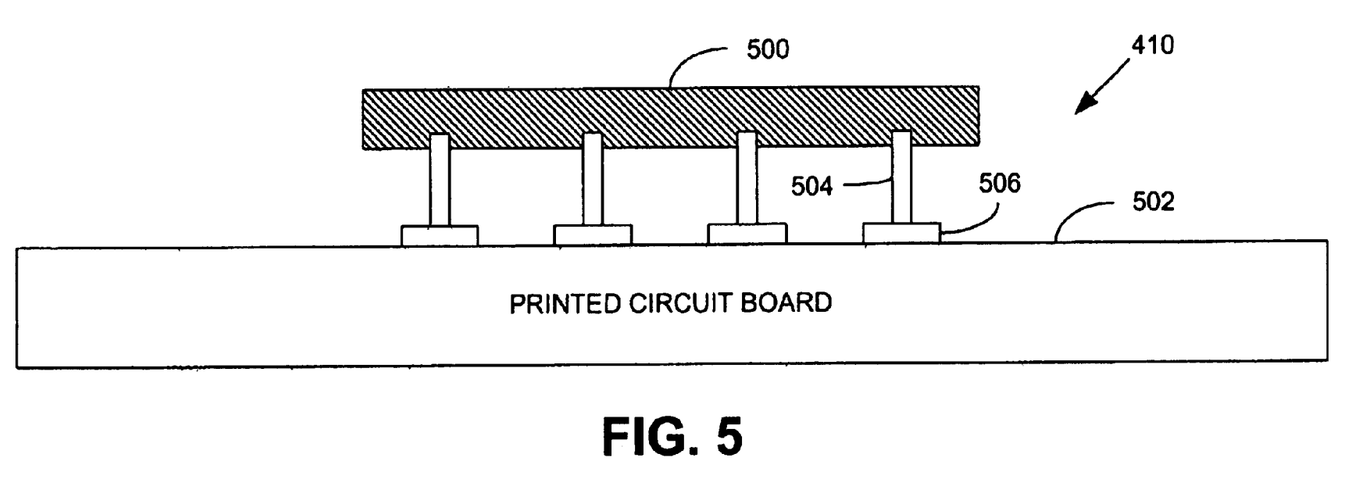
FIG. 5 is a block diagram illustrating a printed circuit board that may be inspected by the system of FIG. 4.
Figure 6:
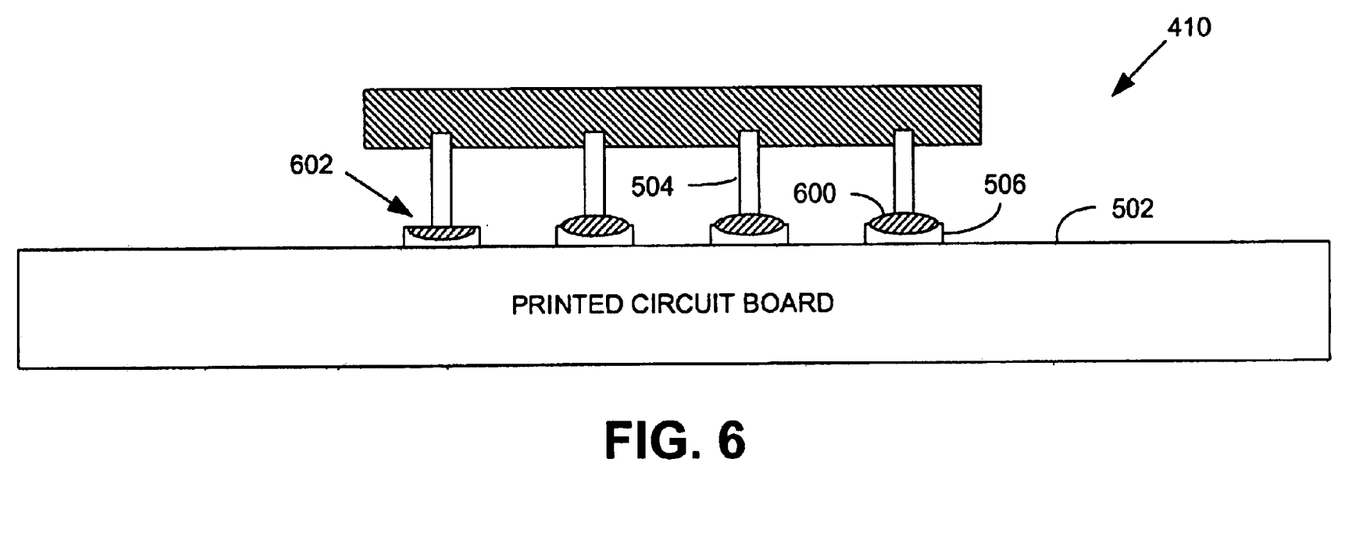
FIG. 6 is a block diagram illustrating a printed circuit board that may be inspected by the system of FIG. 4, which has a manufacturing defect.

FIGS. 5 and 6 illustrate cross-sectional diagrams of a printed circuit board 410 that may be modeled using PCB modeling system 402 and inspected using system 400. As illustrated in FIG. 5, printed circuit board 410 may comprise a component 500 having one or more pins 504. Component 500 may comprise any type of electrical component for which it is desirable to solder to a PCB substrate 502. PCB substrate 502 includes an underlying integrated circuit (IC) that comprises a plurality of termination points 506, which may be soldered to the pins 504 during the manufacturing process.

As illustrated in FIG. 6, during the manufacturing process, component 500 may be electrically connected to the termination points 506 on the PCB substrate 502 via a soldering material 600. FIG. 6 illustrates printed circuit board 410 after the soldering process. By way of example, during the manufacturing process a variety of defects may result. For instance, in FIG. 6, the left-most pin 504 may have a soldering defect (represented by reference numeral 602). One of ordinary skill in the art will appreciate that any of the following, or other, defects may occur during the manufacturing process: open solder joints, shorts, missing components, misaligned components, insufficient solder joints, excess solder joints, reversed capacitors, solder balls, solder voids, etc.

X-ray imaging system 406 comprises imaging hardware and/or software for capturing an x-ray image of a manufactured printed circuit board. One of ordinary skill in the art will appreciate that system 400 may employ any of a variety of other types of imaging techniques (e.g., optical, ultrasonic, thermal image, etc.). X-ray inspection control system 404 interfaces with PCB modeling system 402 and x-ray imaging system 406. For instance, x-ray inspection control system 404 may receive a file containing a computer model of a particular printed circuit board from PCB modeling system 402. Based on the computer model, x-ray inspection control system 404 may generate an inspection program to be implemented by x-ray imaging system 406. The inspection program may be used to image a manufactured printed circuit board, which is based on the computer model generated by PCB modeling system 402. After generating images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

As illustrated in FIG. 4, x-ray inspection control system 404 may implement dedicated help services system 110 in order to improve the inspection process and facilitate generation of the inspection program provided to x-ray imaging system 406. The processes supported by x-ray inspection control system 404 may be very complicated to a user. Thus, dedicated help services system 110 provides dedicated help services associated with the inspection process and/or the generation of the inspection program for the x-ray imaging system 406 to a user within the same screen real estate as the standard application services. As described above, the help services may be continually provided, while the application is active, in the dedicated help services display portion.

Figure 7:
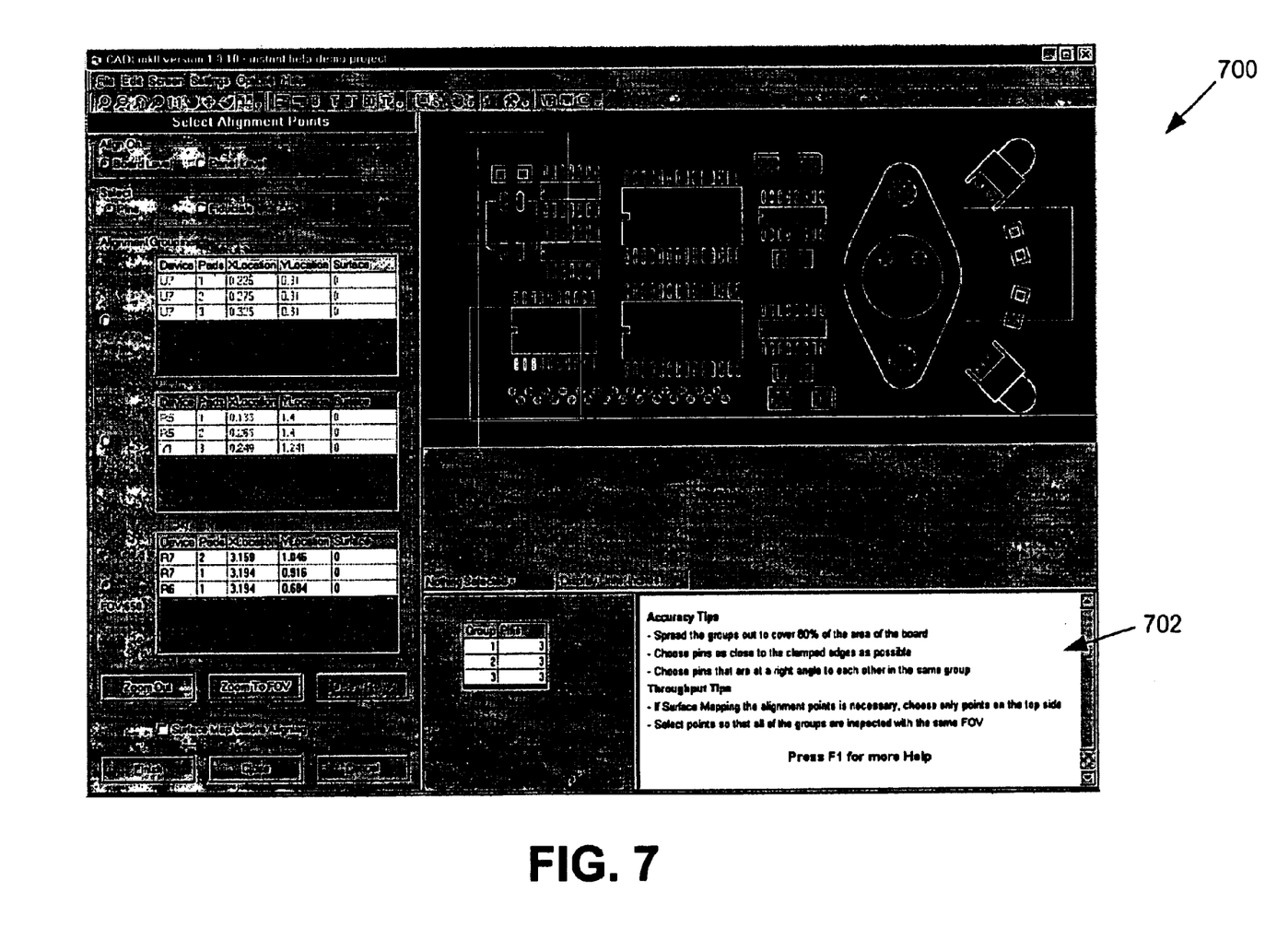
FIG. 7 is a screen shot of another embodiment of a graphical user interface illustrating an implementation of the dedicated help services system of FIG. 3 in the x-ray inspection control system of FIG. 4.

FIG. 7 is a screen shot 700 of another embodiment of a graphical user interface illustrating an implementation of dedicated help services system 110 in x-ray inspection control system 404. As illustrated in FIG. 7, the graphical user interface may comprise a display portion 702 for providing the help services associated with the x-ray inspection control system 404. The display portion 702 is a dedicated portion of the screen real estate associated with graphical user interface for x-ray inspection control system 404. For example, the display portion 702 may be displayed on every screen, window, frame, etc. associated with x-ray inspection control system 404.

It should be emphasized that the above-described embodiments of dedicated help services system 110, particularly, any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A method for providing help services in a graphical user interface-based computer application, the method comprising:
    providing a graphical user interface (GUI) screen having a first display portion for displaying the operations of standard application services of an active computer application and a second display portion for displaying dedicated help services based on the current operations of the standard application services provided by the computer application and displayed in the first display portion;
    determining a user interaction via the first display portion;
    based on the user interaction, providing a first standard application service associated with the computer application for display in the first display portion; and
    based on the first standard application service displayed in the first display portion, displaying dedicated help services in the second display portion;
    wherein the dedicated help services are displayed continually in the second display portion while the computer application is active; and
    wherein the second display portion is a dedicated portion of the entire GUI screen real estate, whereby the first display portion and second display portion do not overlap on the GUI screen.

2. The method of claim 1, further comprising the step of initiating the computer application.

3. The method of claim 1, wherein the step of determining a user interaction via the first display portion is via a cursor manipulated by a mouse.

4. The method of claim 1, wherein the dedicated help services provided in the second display portion are displayed using hypertext markup language (HTML).

5. The method of claim 1, wherein the computer application enables a user to interact with a model of a printed circuit board having at least one component soldered to the printed circuit board via at least one pin.

6. A computer program embodied in a computer-readable medium, the computer program comprising logic configured to:
    provide a graphical user interface (GUI) screen having a first display portion for displaying the operations of standard application services of an active computer application and a second display portion for displaying dedicated help services based on the current operations of the standard application services provided by the computer application and displayed in the first display portion;
    determine a user interaction via the first display portion;
    based on the user interaction, provide a first standard application service associated with the computer application for display in the first display portion; and
    based on the first standard application service displayed in the first display portion, display dedicated help services in the second display portion;
    wherein the logic is further configured to display the dedicated help services continually in the second display portion while the computer application is active; and
    wherein the second display portion is a dedicated portion of the entire GUI screen real estate, whereby the first display portion and second display portion do not overlap on the GUI screen.

7. The computer program of claim 6, wherein the logic is further configured to determine the user interaction via a cursor manipulated by a mouse.

8. The computer program of claim 6, wherein the dedicated help services provided in the second display portion are displayed using hypertext markup language (HTML).

9. The computer program of claim 6, wherein the standard application services provided in the first display portion enable a user to interact with a model of a printed circuit board having at least one component soldered to the printed circuit board via at least one pin.

10. The computer program of claim 6, wherein the standard application services provided in the first display portion enable a user to control an automatic x-ray inspection system configured to detect manufacturing defects in printed circuit boards.

11. A system for running a computer application, the system comprising:
    logic configured to:
        provide a graphical user interface (GUI) screen having a first display portion for displaying the operations of standard application services of an active computer application and a second display portion for displaying dedicated help services based on the current operations of the standard application services provided by the computer application and displayed in the first display portion;

determine a user interaction via the first display portion;

based on the user interaction, provide a first standard application service associated with the computer application for display in the first display portion; and based on the first standard application service displayed in the first display portion of the graphical user interface, display dedicated help services in the second display portion;

a processing device configured to implement the logic; and a display device configured to display the GUI screen;

wherein the display device continually displays the dedicated help services in the second display portion while the computer application is active; and wherein the second display portion is a dedicated portion of the entire GUI screen real estate, whereby the first display portion and second display portion do not overlap on the GUI screen.

12. The system of claim 11, wherein the logic is further configured to determine the user interaction via a cursor manipulated by a mouse.

13. The system of claim 11, wherein the dedicated help services provided in the second display portion are displayed using hypertext markup language (HTML).

14. The system of claim 11, wherein the standard application services provided in the first display portion enable a user to interact with a model of a printed circuit board having at least one component soldered to the printed circuit board via at least one pin.

15. A system for providing a computer application, the system comprising:

means for providing a graphical user interface associated with the computer application, the graphical user interface comprising a first portion for displaying the operations of standard application services of an active computer application and a second portion for displaying dedicated help services based on the current operations of the standard application services provided by the computer application and displayed in the first portion of the graphical user interface;

means for determining a user interaction via the first portion of the graphical user interface;

means for providing, based on the user interaction, a first standard application service associated with the computer application for display in the first portion of the graphical user interface; and means for displaying, based on the first standard application service displayed in the first portion of the graphical user interface, dedicated help services in the second portion of the graphical user interface, wherein the dedicated help services are displayed continually in the second portion while the computer application is active; and wherein the second portion is a dedicated portion of the entire GUI screen real estate, whereby the first portion and the second portion do not overlap on the GUI screen.

16. The system of claim 15, wherein the standard application services provided in the first portion of the graphical user interface enable a user to interact with a model of a printed circuit board having at least one component soldered to the printed circuit board via at least one pin.

17. The system of claim 15, wherein the standard application services provided in the first portion of the graphical user interface enable a user to control an automatic x-ray inspection system configured to detect manufacturing defects in printed circuit boards.

* * * * *